(12) United States Patent
Hack et al.

(10) Patent No.: US 10,423,575 B2
(45) Date of Patent: Sep. 24, 2019

(54) COMPUTATIONAL STORAGE FOR DISTRIBUTED COMPUTING

(71) Applicant: International Business Machines Corporation, Armonk, NY (US)

(72) Inventors: Michel H. T. Hack, Cortlandt Manor, NY (US); Yufei Ren, Somers, NY (US); Wei Tan, Elmsford, NY (US); Yandong Wang, Elmsford, NY (US); Xingbo Wu, Arlington, TX (US); Li Zhang, Yorktown Heights, NY (US); Wei Zhang, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 15/447,262

(22) Filed: Mar. 2, 2017

(65) Prior Publication Data

US 2018/0253423 A1    Sep. 6, 2018

(51) Int. Cl.
*G06F 16/182* (2019.01)
*G06F 16/14* (2019.01)

(52) U.S. Cl.
CPC .......... *G06F 16/14* (2019.01); *G06F 16/1824* (2019.01)

(58) Field of Classification Search
CPC .............................. G06F 16/14; G06F 16/1824
See application file for complete search history.

(56) References Cited

U.S. PATENT DOCUMENTS

| | | |
|---|---|---|
| 8,356,086 B2 | 1/2013 | Liu et al. |
| 8,788,556 B2 | 7/2014 | Zhang et al. |
| 9,286,044 B2 | 3/2016 | Boehm et al. |
| 2004/0117376 A1* | 6/2004 | Lavin ................... G06F 16/9574 |
| 2009/0271336 A1* | 10/2009 | Franks ................... G06Q 99/00 |
| | | 705/500 |
| 2015/0088953 A1 | 3/2015 | Koduvely et al. |
| 2015/0120758 A1 | 4/2015 | Cichosz et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Kris E Mackes
(74) *Attorney, Agent, or Firm* — Law Office of Jim Boice

(57) ABSTRACT

Computational storage techniques for distribute computing are disclosed. The computational storage server receives input from multiple clients, which is used by the server when executing one or more computation functions. The computational storage server can aggregate multiple client inputs before applying one or more computation functions. The computational storage server sets up: a first memory area for storing input received from multiple clients; a second memory area designated for storing the computation functions to be executed by the computational storage server using the input data received from the multiple clients; a client specific memory management area for storing metadata related to computations performed by the computational storage server for specific clients; and a persistent storage area for storing checkpoints associated with aggregating computations performed by the computation functions.

18 Claims, 11 Drawing Sheets

(56) References Cited

U.S. PATENT DOCUMENTS

2016/0028806 A1* 1/2016 Wareing .............. H04L 67/1021
    709/217
2016/0098431 A1 4/2016 Ebsen et al.

OTHER PUBLICATIONS

Ken Hess, "The Story of Storlets: IBM'S Computational Storage Model". The Frugal Networker, May 21, 2014. Web Oct. 10, 2016. <https://frugalnetworker.com/2014/05/21/the-story-of-storlets-ibms-computational-storage-model/>.

Michael Factor, "Storlets: Turning Object Storage Intoa Smart Storage Platform". IBM Research Blog, May 12, 2014. Web Oct. 10, 2016. <https://www.ibm.com/blogs/research/2014/05/storlets-turning-object-storage-into-a-smart-storage-platform/>.

Patterson et al., "A Case for Intelligent RAM: IRAM". IEEE Micro, Apr. 1997, pp. 1-23.

Anderson et al., "The Computational and Storage Potential for Volunteer Computing". Proceedings of the 6th IEEE International Symposium on Cluster Computing and the Grid, May 16-19, 2006, pp. 73-80.

Jean et al., "Mapreduce: A Flexible Data Processing Tool". Communications of the ACM, vol. 53 No. 1, pp. 72-77. Jan. 2010.

Seo et al., "HAMA: An Efficient Matrix Computation With the Mapreduce Framework". Proceedings of the 2010 IEEE Second International Conference on Cloud Computing Technology and Science, Nov. 30-Dec. 3, 2010. pp. 721-726.

Austin et al., "Near-Memory Processing Outline". Nov. 9, 2015, pp. 1-20. <www.eecs.umich.edu/courses/eecs573/lectures/nmc_slides-main.pdf>.

Keeton et al., "A Case for Intelligent Disks (IDISKS)". ACM SIGMOND Record, vol. 27, Issue 3, Sep. 1, 1998, pp. 42-52.

* cited by examiner

US 10,423,575 B2

COMPUTATIONAL STORAGE FOR DISTRIBUTED COMPUTING

BACKGROUND

The present invention relates to the field of computers, and particularly to computers that are capable of supporting distributed computing. Still more particularly, the present invention relates to aggregating distributed computation results.

SUMMARY

In a computer-implemented method embodiment of the present invention, computation operations are performed by a computational storage server, based on multiple inputs. The computational storage server sets up a computational storage media in the computational storage server. The computational storage media is set up to comprise a first memory area for storing input data received from multiple clients, a second memory area designated for storing computation functions executed by the computational storage server using the input data received from the multiple clients, a client specific management metadata area in the computational storage media for storing metadata related to computations performed in the computational storage server for specific clients, and a persistent storage area designated for storing checkpoints for aggregating computations performed by the computation functions. In response to one or more clients from the multiple clients indicating a probe-ready status for the computational storage media, the computational storage server exposes the computational storage media to the multiple clients as an available storage media and then receives from the multiple clients input data, which is used when executing one or more of the computation functions. The computational storage server aggregates outputs of the one or more computation functions that used the received input data as inputs, and returns, to the multiple clients, aggregated outputs of the one or more computation functions that used the received input data as inputs.

Other embodiments of the present invention include a computer system and a computer program product.

DETAILED DESCRIPTION

Figure 1:
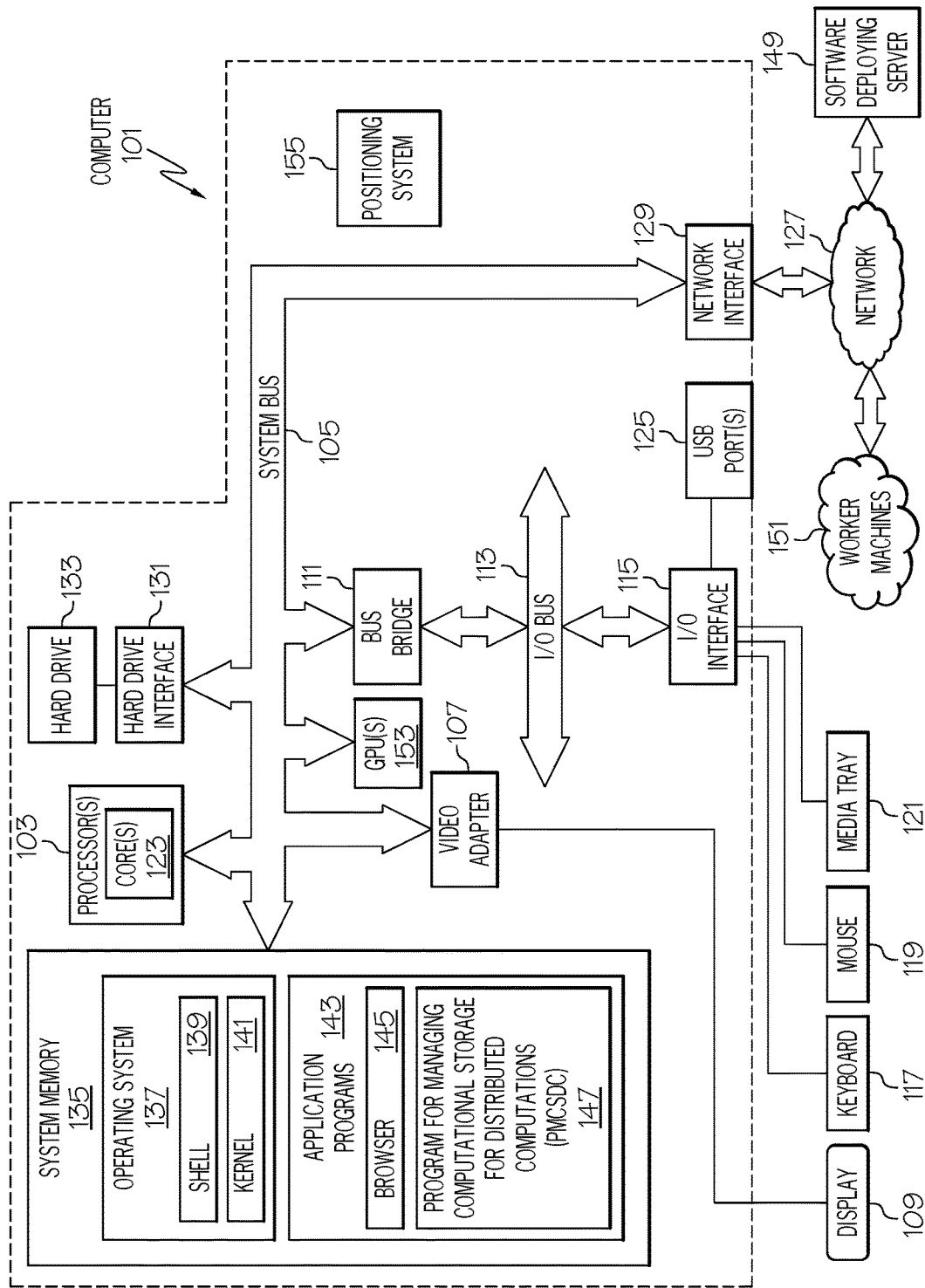
FIG. 1 depicts an exemplary system and network in accordance with one or more embodiments of the present invention.

With reference now to the figures, and in particular to FIG. 1, a block diagram of an exemplary system and network in accordance with one or more embodiments of the present invention is depicted. Some or all of the exemplary architecture, including both depicted hardware and software, shown for and within computer 101 can be utilized by: software deploying server 149 and/or worker machines 151 shown in FIG. 1; and/or computational storage server 201 and/or worker machines 251a-251c shown in FIG. 2; and/or computational storage server 301 and/or client 351 shown in FIG. 3; and/or computational storage servers 401a-401b and/or worker machines 451a-451d shown in FIG. 4; and/or computational storage servers 501a-501b and/or worker machines 551a-551c shown in FIG. 5; and/or computational storage server 601 and/or worker machines/clients 651a-651b shown in FIG. 6; and/or computational storage server 701 and/or worker machines 751a-751c shown in FIG. 7.

Referring now to FIG. 1, exemplary computer 101 includes processor(s) 103, operably coupled to a system bus 105. Although a single processor and core are shown, processor(s) 103 may embody or use multiple processors, one or more of which may have one or more processor core(s) 123. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or worker machines 151 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment in a network "cloud" environment will be discussed with reference to FIGS. 10 and 11.

Referring again to FIG. 1, a hard drive interface 131 is also coupled to system bus 105. Hard drive interface 131 interfaces with a hard drive 133. In one embodiment, hard drive 133 is a non-volatile memory storing and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a world wide web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in computer 101's system memory include Program for Managing Computational Storage for Distributed Computations (PMCSDC) 147. In some embodiments, system memory 135 can be shared and/or application programs 143 distributed across one or more software deploying servers 149 or other systems. In the example depicted, PMCSDC 147 includes program instructions (software) adapted for implementing processes and/or functions in accordance with the present invention, such as (without limitation) those described with reference to FIGS. 2-9. In some embodiments, PMCSDC 147 is downloaded from software deploying server 149, (on-demand or "just-in-time") e.g., where the PMCSDC 147 software is not downloaded until needed for execution. In some embodiments of the present invention, software deploying server 149 can perform all (or many) of the functions associated with the present invention (including execution of PMCSDC 147), thus freeing computer 101 from having to use its internal computing resources.

In some embodiments, computer 101 includes one or more graphics processing units depicted as GPU(s) 153. A graphics processing unit (GPU) is a processing device that is specifically architected to handle large strings of data, which are often associated with a graphics display. That is, a GPU is designed to handle strings of data that are used to control the appearance of pixels on a display. One or more embodiments of the present invention utilize GPU(s) 153 not only to analyze data associated with pixels in a display, but also to execute the distributed computations described herein.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Many data intensive applications can be expressed as matrix computations. Examples of such data intensive applications include machine learning, such as gradient computations (e.g., using a stochastic gradient descent—(SGD)), in which optimized vectors/matrices of parameters can be ascertained iteratively. An exemplary embodiment of a computational storage server supporting a distributed matrix computation in accordance with the present invention will be described in more detail with respect to FIG. 6.

Figure 2:
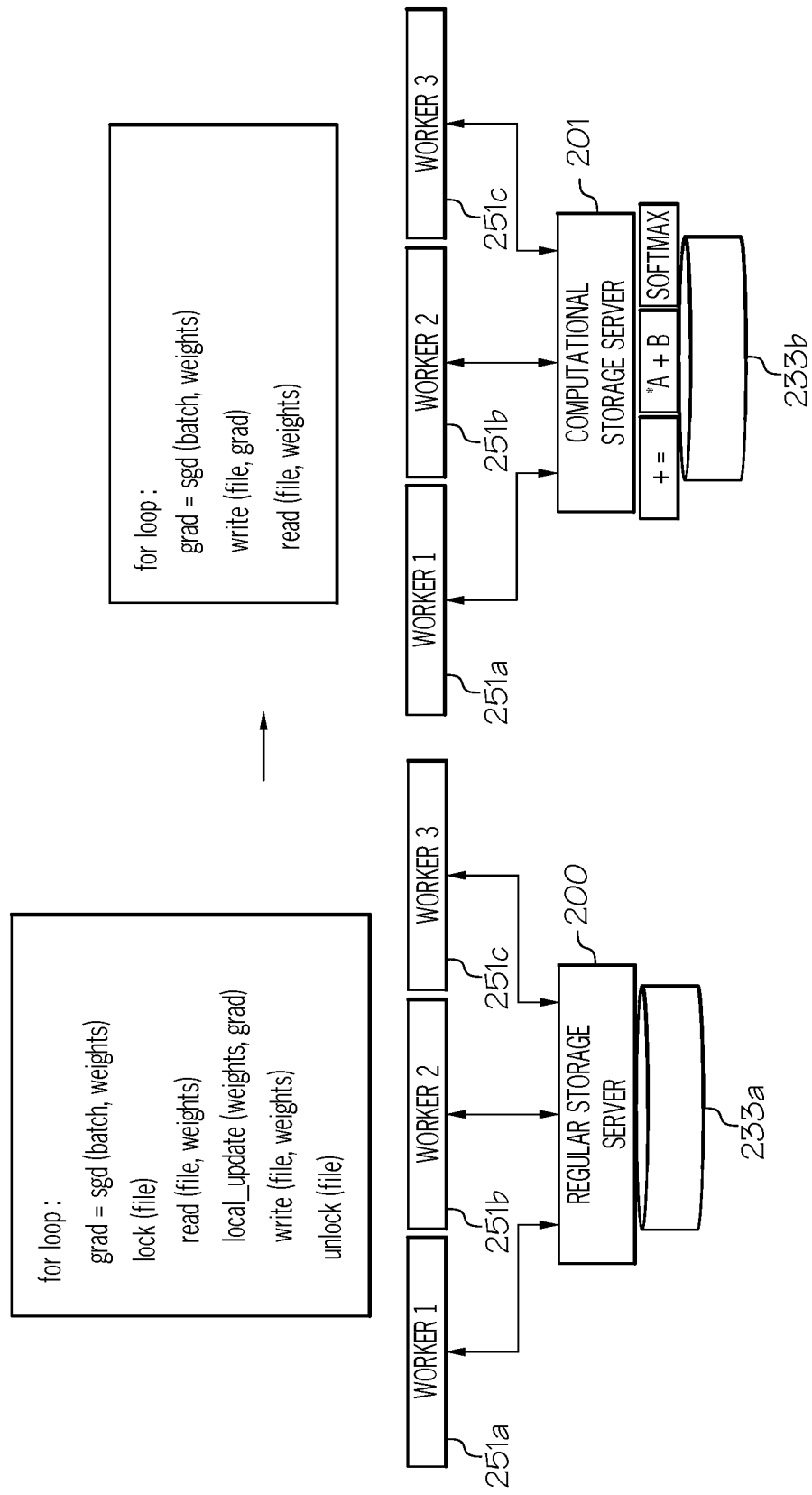
FIG. 2 illustrates an exemplary computational storage server being utilized by multiple client/worker devices in accordance with one or more embodiments of the present invention.

With reference now to FIG. 2, an exemplary computational storage server being utilized by multiple client/worker devices, in accordance with one or more embodiments of the present invention, is depicted.

In this example, abstract global shared matrices are accessed as regular files, but with a modification that enables computations inside computational storage servers, such that storage input/output (I/O) operations are leveraged in order to manipulate the matrices.

For the purpose of this example (only) consider storage server 200 as having the functionality of a local disk. That is, clients 251a-251c (respectively shown as "Worker 1", "Worker 2", and "Worker 3") sequentially access a gradient (matrix) function global shared matrix abstracted as a regular file that is stored in storage 233a from a regular storage server 200. As such, each worker must lock the function shared file (e.g., "grad—sdg(batch, weights)") when using it, and unlock it when through. For example, Worker 1 may execute the matrix function "grad" ("gradient") by calling the function stochastic gradient descent (sgd) and using the "batch" inputs (e.g., in a current view of the global file content (not depicted)), along with the parameter "weights". In order to ensure that the operations of "sgd" on the shared file content are not compromised or outputs altered while being used by Worker 1, Worker 1 will lock the file content such that no other worker can use modify or update it at that time. Once Worker 1 has finished using "sgd", then Worker 1 will release ("unlock") "sgd", such that Worker 2 or Worker 3 can now use it. Such a system is slow and not scalable.

Thus, some embodiments of the present invention provide a new computational storage server 201 (architecturally similar to computer 101 shown in FIG. 1) that can provide various types of operations associated with "sgd", including computation functions 203, which can include arithmetic operations (e.g., averaging, summing, gradient calculations, etc.) as well as softmax operations (an example of which is discussed in more detail below).

That is, rather than allowing each worker to "check out" an algorithm, the computational storage server 201 receives worker data from clients 251a-251c, and then aggregates the results, such that computational functions are enabled inside the computational storage server 201 and are not performed by the Workers 1-3. Thus, results that are returned to the Workers 1-3 are not the results of just the computation performed using input data from a particular worker (as in the system that uses the regular storage server 200), but rather are an aggregation of what multiple workers have requested by supplying their different data. This system provides multiple advantages over the prior art (and thus improves the functionality of the system that includes the workers and the storage server). Such advantages include higher performance when the computation results are used in networking, computation, etc. Furthermore, the system enables leveraging of existing distributed storage architectures in order to improve performance, fault-tolerance, portability, etc., by extending computation operations and synchronization scenarios.

Thus, all computations of algorithms (using data from different workers) can be performed within computational storage server 201. As such, the results of the all the computations, rather than a single iteration of an algorithm, can be returned to the workers, such that there are no "interim" results being returned to the workers.

Figure 3:
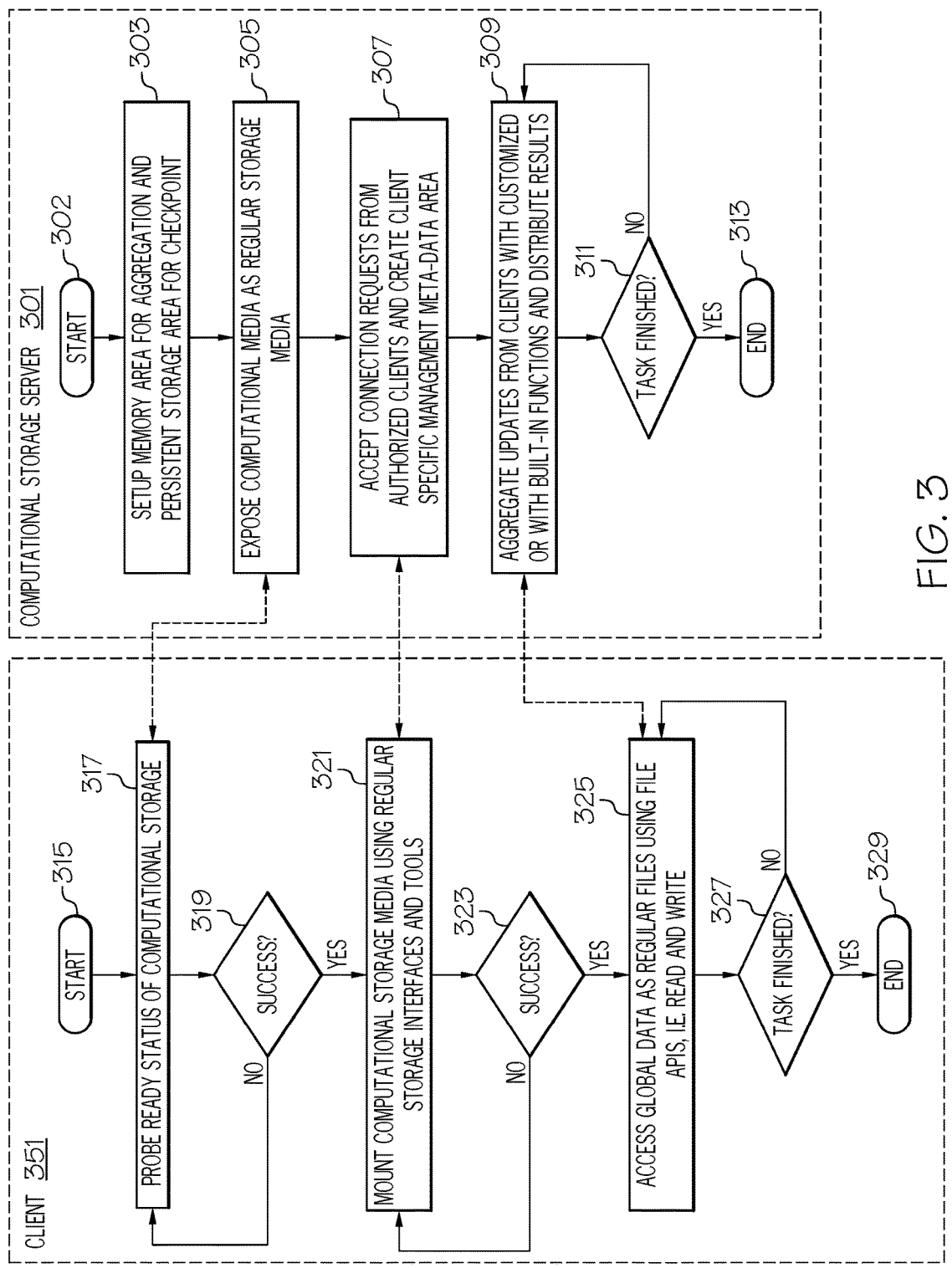
FIG. 3 depicts an exemplary relationship between a client and a computational storage server in accordance with one or more embodiments of the present invention.

FIG. 3 depicts exemplary processes (and a relationship between such processes) performed by a client 351 and a computational storage server 301 in accordance with one or more embodiments of the present invention. Examples of client 351 include one or more of the clients 251a-251c shown in FIG. 2. An example of computational storage server 301 includes computational server 201 shown in FIG. 2.

As depicted in FIG. 3, after initiator block 302, the computational storage server 301 sets up a memory area for aggregation and a persistent storage area for checkpoints, as described in block 303. More specifically and in one or more embodiments of the present invention, the computational storage server 301 sets up a computational storage media (e.g., storage 233b shown in FIG. 2) in the computational storage server 301. This computational storage media is set up to include a first memory area for storing the input data received from the multiple clients (e.g., Workers 1-3 shown in FIG. 2); a second memory area designated for storing computation functions 203 that are executed by the computational storage server 301 using the input data received from the multiple clients; a client specific management metadata area in the computational storage media for storing metadata related to computations performed in the computational storage server for specific clients (e.g., metadata that describes what type of computational operation is being performed for a particular worker); and a persistent storage area designated for storing checkpoints (e.g., used to pause the use of a particular computational function until it is used by all of the Workers 1-3) in order to aggregate the performed computations.

Returning to FIG. 3, after initiator block 315 the client 351 checks a probe-ready status of computational storage in the computational storage server 301, as shown in block 317. That is, the client 351 checks with the computational storage server 301 to see if the computation function (from computation functions 203) currently needed by the particular client 351 is available to be used on behalf of (but not directly by) the client 351. If the particular computation function is available to be used on behalf of the client 351 (using input data supplied by the client 351), then the computational storage server 301 will expose the computational media as a regular storage media, as shown in block 305. Thus, the computational storage server 301 does not supply a copy of the actual computation function to the client 351, but rather provides the client 351 with a non-executable statement (from "regular storage media") indicating that the requisite computation function is ready to receive input data from the client 351.

As shown in query block 319 and block 321, the client (assuming that the probe-ready status is "yes") mounts the computational storage media (that has the computation functions) using regular storage interfaces and tools (block 321). That is, the client 351 accesses an interface with the computational storage server to make use of the computation functions available to ("mount to") the client 351. This allows the computational storage server 301 to accept connection requests from authorized clients (e.g., Worker 1), and to create a client specific management meta-data area (block 307). That is, the computational storage server 301 not only allows the client 351 to send data to be used by the particular computation function, but also sets up a meta-data area within the memory of the computational storage server 301 that identifies which client (client 351) is using which computation function (e.g., a gradient function).

As shown in blocks 325 and 309, the computational storage server 301 takes data obtained by the client 351 from read operations to various devices (block 325) as well as other clients, and then aggregates the results of the computations, which are distributed at the same time to all of the clients that have provided data for computations (block 309). If there are not more computations to be performed for the clients (query blocks 327 and 311), the flow chart ends (terminator blocks 329 and 313).

Figure 4:
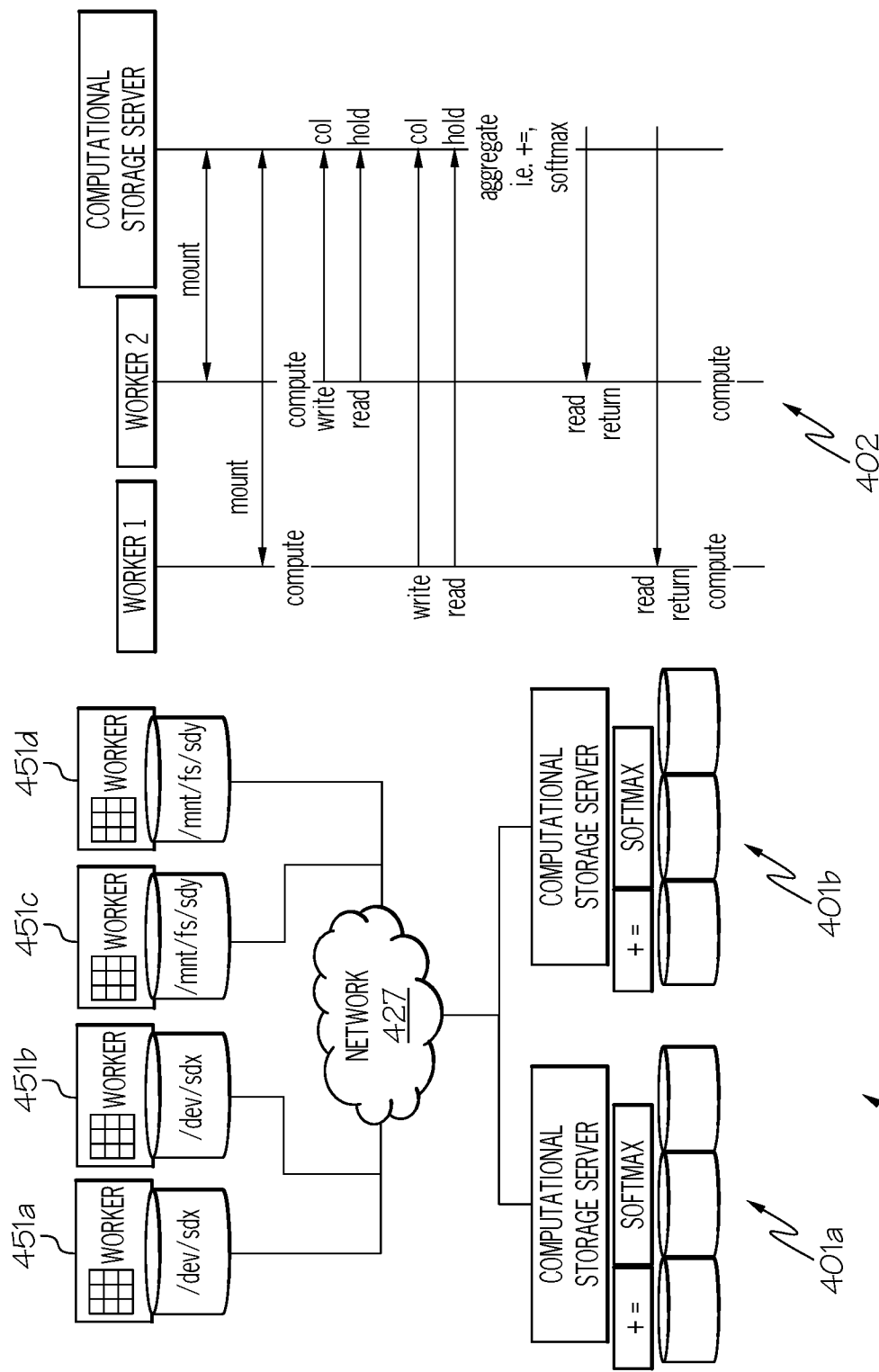
FIG. 4 illustrates an example of multiple worker/client systems interacting with one or more computational storage servers in accordance with one or more embodiments of the present invention.

FIG. 4 depicts an exemplary system (and a logic flow of system interactions) in accordance with one or more embodiments of the present invention.

As depicted, clustered/distributed storage system 400 includes multiple worker/clients 451a-451d communicating via a network 427 (analogous to network 127 shown in FIG. 1) to multiple computational storage servers 401a-401b. This provides data redundancy (fault tolerance) as well as improved performance (due to faster execution times due to the parallel operations). That is, workers/clients 451a-451b may send data to be used in averaging operations (shown as "+=") performed by the computational storage servers 401a-401b, while workers/clients 451c-451d may send data to be used in softmax operations (also performed by the computational storage servers 401a-401b). (A "softmax" function is a logistic function that reduces a multidimensional vector of real values into a multidimensional vector of real values in the range of 1.0 that add up to 1. For example, the initial vector may be the values 2, 3, 5. In this vector, the real number "5" is the largest number, and thus may be given the greatest weight (0.5), while 2 is given the weight of 0.2 and 3 is given the weight of 0.3. As such, 0.5, 0.3, and 0.3 make up the secondary vector whose values total 1.0 (0.5+0.3+0.2=1.0).

Some embodiments of FIG. 4 include an exemplary use case for unifying storage and parallel computing. That is, the parallel computing may be either standalone (using posix threads, OpenMP, etc.) or distributed (using MPI collective, MapReduce, etc.). Some embodiments of the present invention allow the workers/clients 451a-451d to use a distributed file system instead of a distributed data store (such as a distributed database).

The difference between a distributed file system and a distributed data store is that a distributed file system allows files to be accessed using the same interfaces and semantics as local files (e.g., mounting/unmounting, listing directories, read/write at byte boundaries, etc. using a system's native permission model). Distributed data stores, by contrast, require using a different API or library and have different semantics (most often those of a database). Thus, the present invention uses a distributed file system that allows workers/clients 451*a*-451*d* to access different computation functions, whose results are aggregated/synchronized by the computation storage server, as shown in flow chart 402. By utilizing the tools shown in flow chart 402 and described elsewhere herein, the present invention can utilize portable POSIX file I/O APIs for computational tasks.

Referring now to the logic flow 402, Worker 1 (e.g., worker/client 451*a*) mounts ("tells" the computational storage server (e.g., computational storage server 401*a*) that it wants) an averaging computation function ("+="), while Worker 2 (e.g., worker/client 451*c*) mounts a softmax computation function ("softmax"). The depicted write ("col"—for "collect") and read ("hold") operations tell the computational storage server which computation functions are to be used by the computational storage server on behalf of the Workers 1-2. Note that these computation functions may be disparate (different), and thus may perform different operations (average and softmax) which may be written in different computer languages (e.g., C++ and SQL) and/or use different operating systems (e.g., UNIX and Windows). Nonetheless, the computational storage server has interfaces that allow the different operations to communicate with and synchronize with one another. After all of the operations have executed using the data provided by the various workers/clients, the final aggregated result is returned to the workers in a format/language that they will understand.

Figure 5:
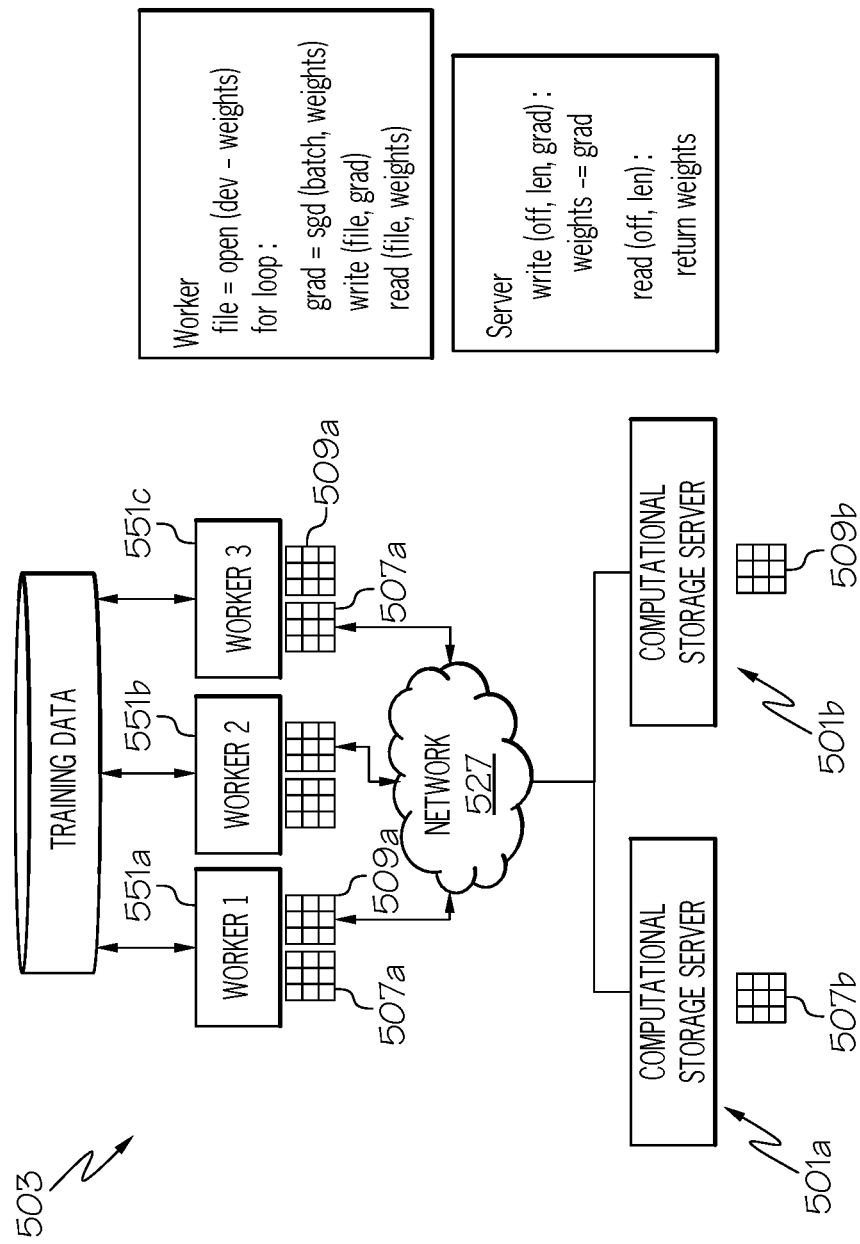
FIG. 5 depicts an exemplary computational storage server supporting a deep learning process, in accordance with one or more embodiments of the present invention.

FIG. 5 depicts an exemplary computational storage server supporting a deep learning process, in accordance with one or more embodiments of the present invention.

By way of overview, deep learning can use training data to create a model that can ingest other data for prediction purposes (e.g., predicting classifications of data). An exemplary deep learning model may contain equations with billions of parameters (not depicted) represented as matrices/vectors. In general, a parameter server is a centralized repository for managing global shared parameters.

Figure 8:
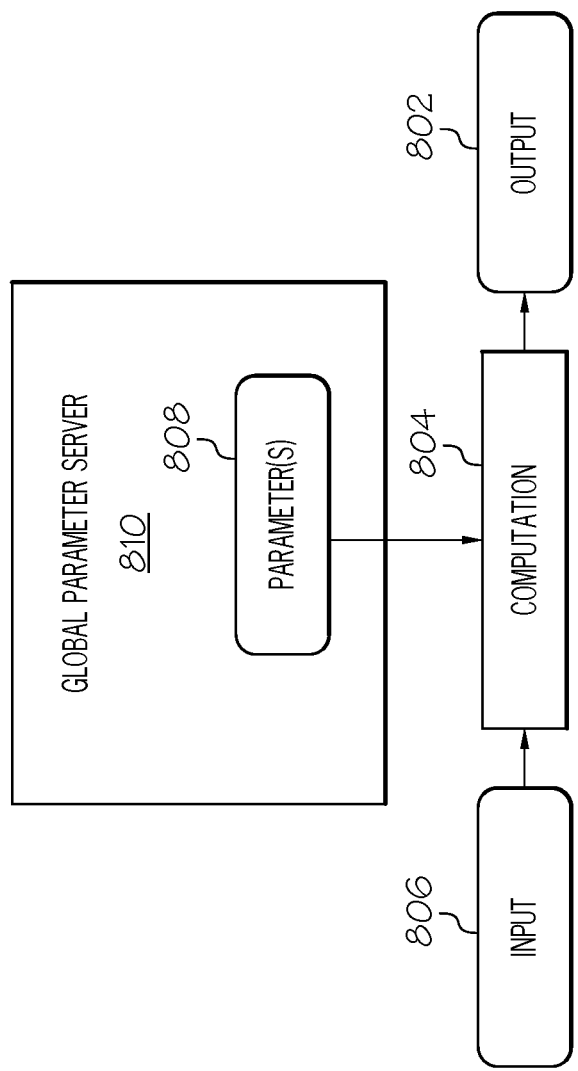
FIG. 8 depicts an exemplary use of parameters when performing a computation from a computational storage server, in accordance with one or more embodiments of the present invention.

With reference also to FIG. 8, a global parameter server 810 provides parameters 808 to a distributed computation 804. Thus, when inputs 806 (e.g., from Workers 1-3 shown in FIG. 5) are also input to distributed computation 804, the computation 804 can be constrained by the parameters 808, e.g., parameter rules that accordingly adjust the output 802. This can lead to improved performance (e.g., in the case of a high frequency communication system in which certain parameters must be abided by), as well as fault-tolerance (e.g., where parameter rules provide ranges of values that must be followed).

Continuing now with FIG. 5, the system can provide computational storage that can abstract distributed computational resources as a unified access point for all the workers, thus automatically sharing computation tasks across storage servers. In some embodiments, redundant array of independent disks (RAID) 0 (striping) is employed. In some embodiments, RAID 1 (mirroring) is employed.

For purposes of this example (only), assume that clients 551*a*-551*c* (also depicted and/or referred to as Workers 1-3) each are able to supply data from a matrix 507*a* and a matrix 509*a*. Assume further that the type of data in matrix 507*a* and matrix 509*a* are the same in one embodiment, but are different in another embodiment. For example, matrix 507*a* may contain base ten numbers, while matrix 509*a* may contain binary numbers, and thus are different types of data. Assume further that computational storage server 501*a* has a computation function that handles base ten numbers, while computational storage server 501*b* has a computation function that handles binary numbers. As such, the matrix 507*b* stores the result of all base ten computations for data from the matrices 507*a* found in Workers 1-3, while the matrix 509*b* stores the result of all binary computations for data from the matrices 509*a* found in Workers 1-3. A RAID 0 system can provide faster performance e.g., by striping the different computation functions to different areas of disk memory. A RAID 1 system can improve fault-tolerance, e.g., by causing both computation storage server 501*a* and computation storage server 501*b* to perform the same base ten operations on data from matrices 507*a* found in Workers 1-3, and both computation storage server 501*a* and computation storage server 501*b* would also perform the same binary operations on data from matrices 509*a* found in the Workers 1-3.

Figure 6:
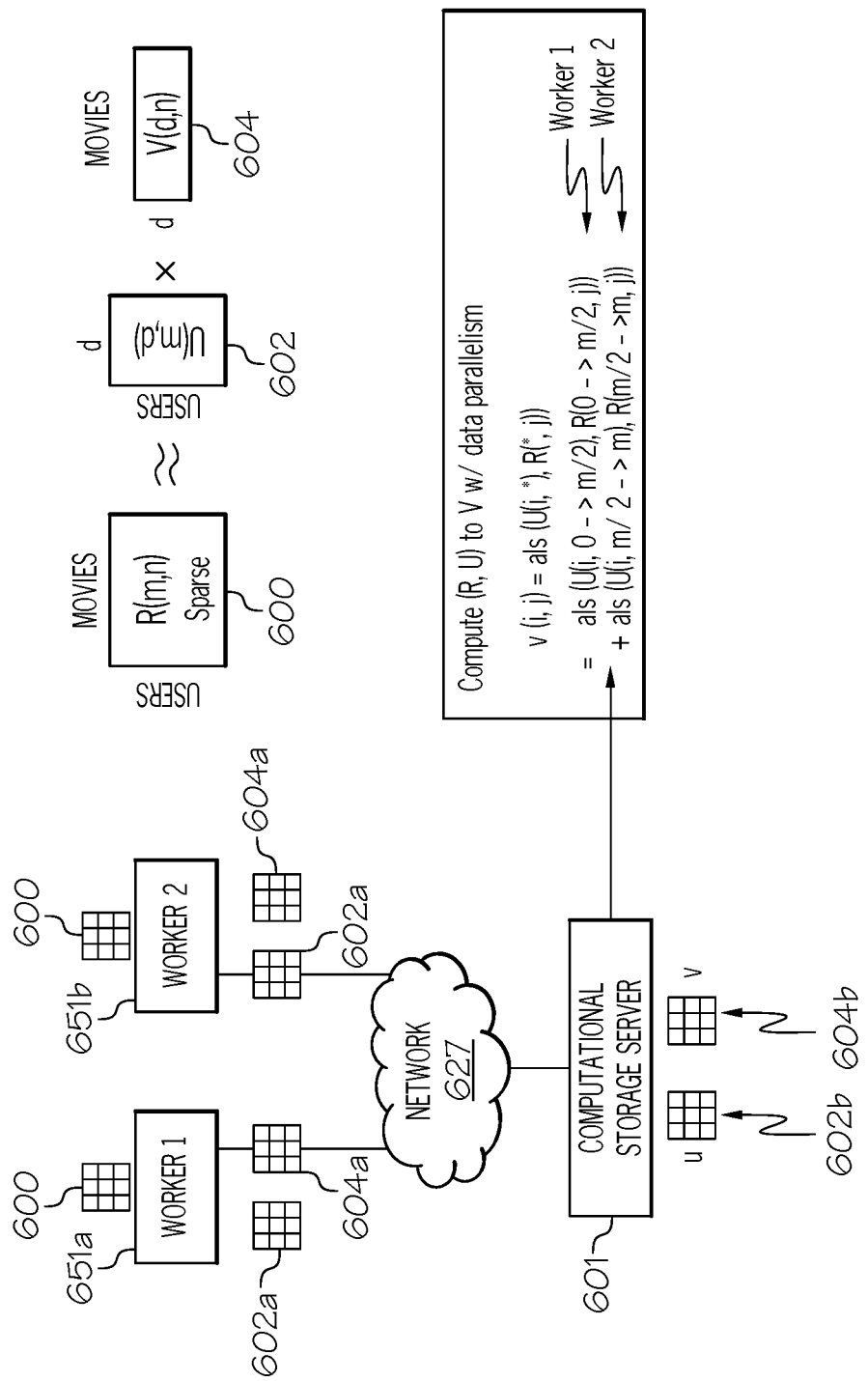
FIG. 6 illustrates an exemplary computational storage server supporting a distributed matrix computation, in accordance with one or more embodiments of the present invention.

FIG. 6 depicts an exemplary computational storage server supporting a distributed matrix computation, in accordance with one or more embodiments of the present invention.

As mentioned earlier, many data intensive applications can be expressed as matrix computations. Examples of such data intensive applications include machine learning, such as gradient computations (e.g., using a stochastic gradient descent—SGD), in which optimized vector/matrices of parameters can be ascertained iteratively.

One technique for speeding up SGD is to parallelize the computation of the gradient for a mini-batch across mini-batch elements. For example, if the system uses a mini-batch size of 1000 elements, it can use 10 replicas of the model (computation) to compute the gradient for 100 elements, and then combine the gradients and apply updates to the parameters synchronously. In each iteration, the input data can be divided into subsets, such that there is no dependency among the subsets. Each worker then works on a subset of the input data, and all the workers process the input data in parallel.

Other data intensive applications that use matrix computation include recommender systems that utilize matrix factorization, which factorizes a large sparse matrix into two smaller matrices iteratively. Similarly, matrix multiplication can determine the rankings of a set of web pages iteratively.

In such matrix computations, central processing units (CPUs), graphical processing units (GPUs), and field programmable gate arrays (FPGAs) can be distributed across different computation machines. That is, input data and workloads are distributed over workers, which then share the resources of the different computation machines. Such a system needs aggregation and synchronization functions in order to allow a group of computation machines (servers) to maintain globally shared matrices (parameters, models, status, etc.), and to collect and aggregate contributions (vectors/matrices) from the workers. This enables matrix retrieval (by the workers) and matrix persistence (using checkpoints in the distributed matrix computations).

Matrix aggregation and distribution often involve network communication, computation, and synchronization. That is, aggregation operations must aggregate/synchronize operations such as matrix addition, subtraction, scalar multiplication, etc. A global shared matrix is often abstracted as a particular object with specified application program interfaces (APIs) and distributed primitives to access it. This presents several challenges to a distributed environment, including the need to develop a specialized system to support matrix aggregation; performance required to support a large amount of workers communicating with servers in a high communication frequency; fault-tolerance; programming model and programming languages support (particularly where such programming languages differ between workers); and portability. Thus, in a distributed environment, the matrix aggregation of worker applications needs to be modified in order to use such a system.

Referring now to FIG. 6, non-negative matrix factorization can decompose a large sparse matrix R(m,n) 600 (which is depicted as a matrix of Movies that Users have watched and/or are interested in and/or own a copy of, etc.) into smaller matrices U(m,d) 602 and matrix V(d,n) 604). For example, "m" may be tens of billions of entries; "d" may be between 10 and 100 entries; and "n" may be tens of millions of entries. As such, matrix U (602) is only hundreds of GB and matrix V (604) is only hundreds of MB, compared to the terabytes of data that are consumed by matrix R (600).

Referring again to FIG. 6, worker 1 and/or worker 2 (clients 651*a* and/or 651*b*, respectively) can iteratively (using a localized or distributed technique) compute/decompose matrix R 600 into matrix U 602 and then V 604. Such computations (which decompose matrix R 600) can be used to determine alternating least squares (ALS) values for matrix 600.

Some embodiments may use a distributed matrix factorization with the computational storage server 601. The ALS can also be paralleled through the workers (e.g., Workers 1-2) and aggregated in computational storage server 601. For example, Worker 1 (client 651*a*) decomposes matrix R (600) into submatrix U (602*a*) and submatrix V (604*a*). Similarly, Worker 2 (client 651*b*) can also decompose matrix R (600) into submatrix U (602*a*) and submatrix V (604*a*). However, Worker 1 may only send submatrix 604*a* to the computational storage server 601 via network 627, while Worker 2 only sends submatrix 602*a* to the computational storage server 601. By way of further example, each of Workers 1-2 request (via network 627) that the computational storage server 601 process the data from the respective submatrices they send to the computational storage server 601. Computational storage server 601 processes the data from submatrix 602*a* and submatrix 604*a* into respective partial results (see submatrices 602*b* and 604*b*).

In some embodiments, computational storage server 601 then returns the output (submatrices 602*b* and 604*b*) from the computation functions(s) used by computational storage server 601 to the Workers 1-2. Workers 1-2 can then reassemble the submatrices 602*b* and 604*b* into an updated version of the matrix 600. That is, worker 1 can execute the function als(U(i, 0→m/2), R(0→m/2, j)), while worker 2 can execute the function als(U(i, m/2→m), R(m/2→m, j)), which are then reassembled into matrix 600 (i.e., submatrix 602*b* plus submatrix 604*b*).

In some embodiments, the computational storage server 601 aggregates the contributions (e.g., submatrices 602*a* and 604*a*) from the workers (e.g., Workers 1-2) before performing the computations. For example, the data from the received submatrices 602*a* and 604*a* may be averaged, etc. before being run through the ALS computation function (i.e., various instances of V(i,j)) within the computational storage server 601.

Figure 7:
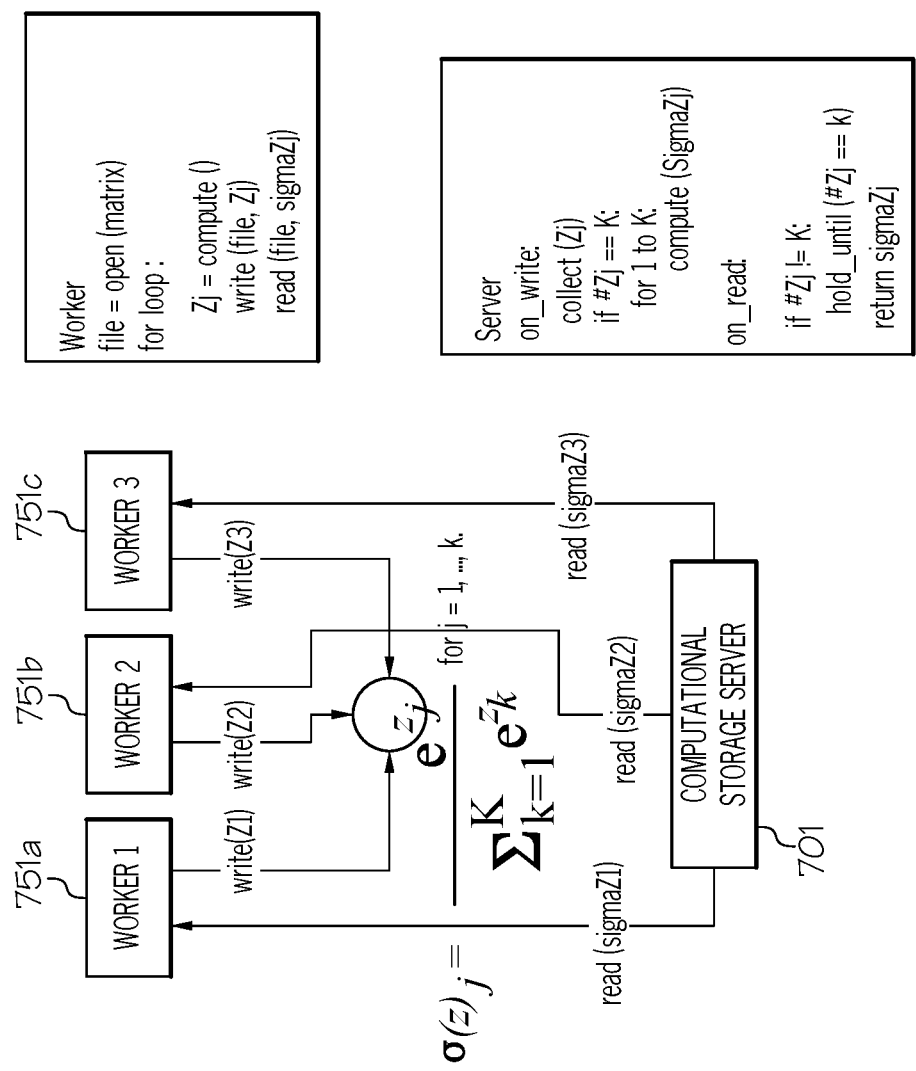
FIG. 7 depicts an exemplary computational storage server supporting a distributed softmax function, in accordance with one or more embodiments of the present invention.

FIG. 7 depicts the presently presented computational storage server supporting a softmax function. As discussed above, a softmax function transforms a K-dimensional vector z of arbitrary real values to a K-dimensional vector σ(z) of real values in the range (0, 1) that add up to 1. Softmax is used in deep learning, i.e. the last layer of a network used for classification. As described in FIG. 7, a computational storage server 701 collects Z from all the Workers 1-3 (751*a*-751*c*), computes the σ(z) according to all the learners Z, and distributes σ(z) to the corresponding workers.

FIG. 8 depicts an exemplary use of parameters when performing a computation from a computational storage server, in accordance with one or more embodiments of the present invention. As described above, a global parameter server 810 provides parameters 808 to a distributed computation 804. Thus, when inputs 806 (e.g., from Workers 1-3 shown in FIG. 5) are also input to distributed computation 804, the computation 804 can be constrained by the parameters 808, e.g., parameter rules that accordingly adjust the output 802.

Figure 9:
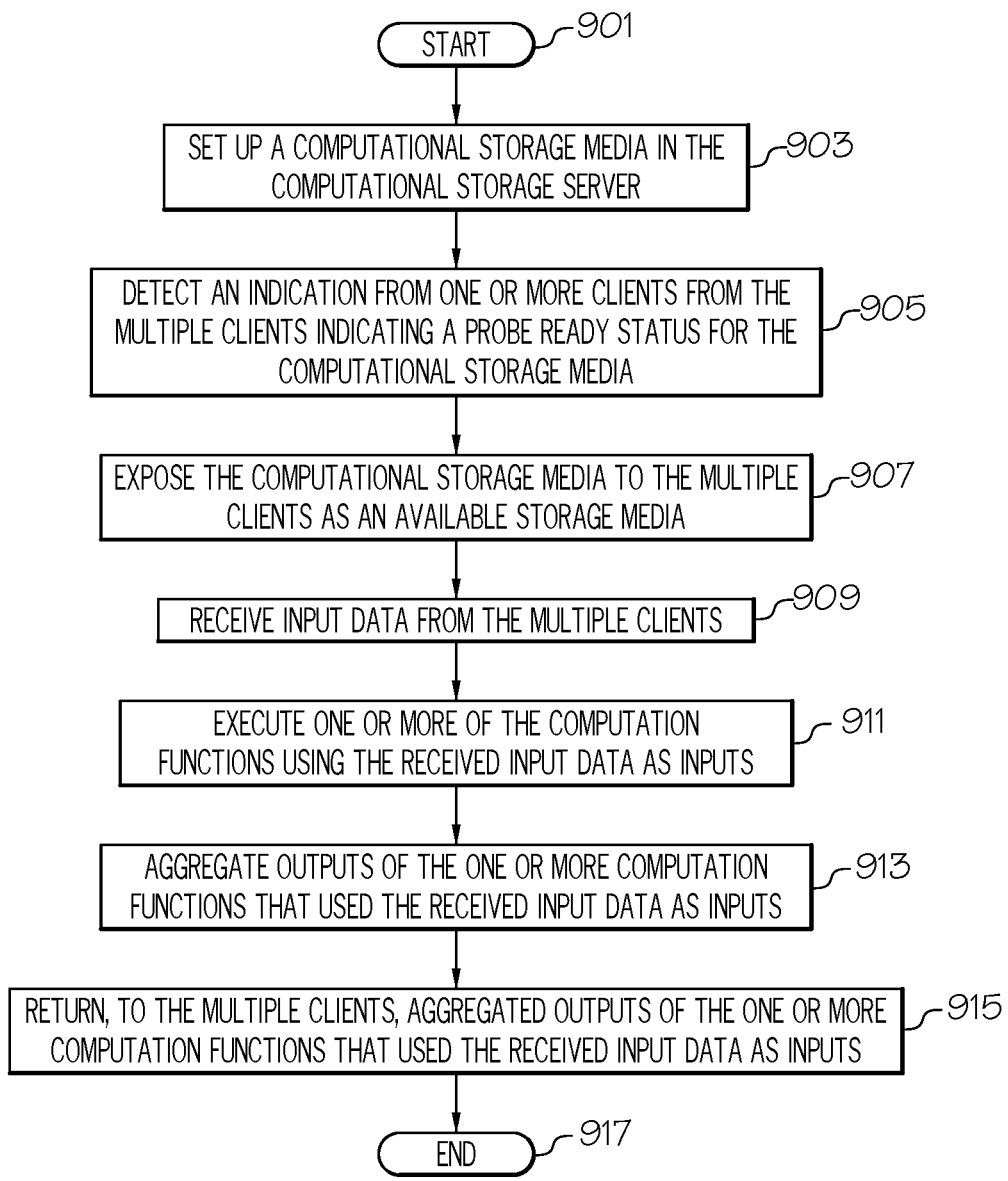
FIG. 9 depicts an exemplary method in accordance with one or more embodiments of the present invention.

FIG. 9 depicts an exemplary method in accordance with one or more embodiments of the present invention.

As depicted, after initiator block 901, a computational storage server (e.g., computational storage server 301 shown in FIG. 3) sets up a computational storage media (e.g., storage 233*b* shown in FIG. 2) in the computational storage server, as depicted in block 903. The computational storage media is set up to include a first memory area for storing input data received from multiple clients, a second memory area designated for storing computation functions executed by the computational storage server using the input data received from the multiple clients, a client specific management metadata area in the computational storage media for storing metadata related to computations performed in the computational storage server for specific clients, and a persistent storage area designated for storing checkpoints for aggregating computations performed by the computation functions. (See FIG. 3.)

As described in block 905, the computational storage server detects an indication from one or more clients from the multiple clients indicating a probe-ready status for the computational storage media.

As described in block 907, in response to one or more clients from the multiple clients indicating the probe-ready status for the computational storage media, the computational storage server exposes the computational storage media to the multiple clients as an available storage media.

As described in block 909, the computational storage server receives input data from the multiple clients.

As described in block 911, the computational storage server executes one or more of the computation functions using the received input data as inputs.

As described in block 913, the computational storage server aggregates outputs of the one or more computation functions that used the received input data as inputs.

As described in block 915, the computation storage server returns, to the multiple clients, aggregated outputs of the one or more computation functions that used the received input data as inputs.

The flow chart ends at terminator block 917.

In an embodiment of the present invention, the computational storage server sets up a persistent storage area in the computational storage media that is designated for storing and returning checkpoints used during said aggregating the outputs of the one or more computation functions. These checkpoints are assigned to points in the computation functions where 1) inputs from different workers need to be received, and 2) outputs from the computation functions need to be aggregated.

In an embodiment of the present invention, multiple clients transmit the updated data to the computational storage server using POSIX-compliant I/O interfaces. POSIX (Portable Operating System Interface) is a family of standards for maintaining compatibility between operating systems. POSIX defines application programming interfaces (APIs) that allow applications to run on different operating systems without changing programming interfaces, such that different operating systems can communicate with one another via established input/output (I/O) interfaces.

In an embodiment of the present invention, the computational storage server is a management computational storage server, and one or more computation functions are a matrix of multiple different computational functions that execute using different computer languages. That is, the management computational storage server coordinates operations of computation functions, even though they are written in different computer languages. Thus, in this embodiment the management computational storage server splits the matrix into multiple sub-matrixes of computation functions, where each of the multiple sub-matrixes is written in a different computer language than other sub-matrixes from the multiple sub-matrixes, and then stores each of the multiple sub-matrixes into a different computational storage server (where each different computational storage server is specific for a particular computer language).

For example, referring again to the example depicted in FIG. 6, assume that not only can data in matrix 600 be split into sub-matrices 602 and 604, but the computation functions being run within computational storage server 601 are also a matrix of computation functions, where each submatrix in the matrix of computation functions is a different computation function (which may or may not execute using the same OS/language as other computation functions in the original matrix).

The management computational storage server receives first data from a first client (e.g., client 651*a* shown in FIG. 6) that is written in a first computer language and second data from a second client (e.g., client 651*b* shown in FIG. 6) that is written in a second computer language. The management computational storage server then transmits the first data to a first computational storage server (e.g., computational storage server 501*a* shown in FIG. 5) that contains a first sub-matrix computational function that runs under the first computer language and the second data to a second computational storage server (e.g., computational storage server 501*b* shown in FIG. 5) than contains a second sub-matrix computational function that runs under the second computer language. Thereafter, the management computational storage server receives a first result from the first computational storage server and a second result from the second computational storage (where the first result is an output of the first sub-matrix computational function using the first data and the second result is an output of the second sub-matrix computational function using the second data).

The management computational storage server then consolidates the first result and the second result into a consolidated result, which is sent (by the management computational storage server) to the first client and the second client.

Referring again to the example depicted in FIG. 8, in some embodiments of the present invention, a first computational storage server 804 receives a set of global parameters 808 from a global parameter server 810, where the set of global parameters 808 comprises data that weights one or more operands used in the first sub-matrix computational function. Multiple learner processors (not depicted) in the first computational storage server then execute the first sub-matrix computational function using the set of global parameters.

One or more embodiments of the present invention may be implemented in a cloud computing environment. Nonetheless, it is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
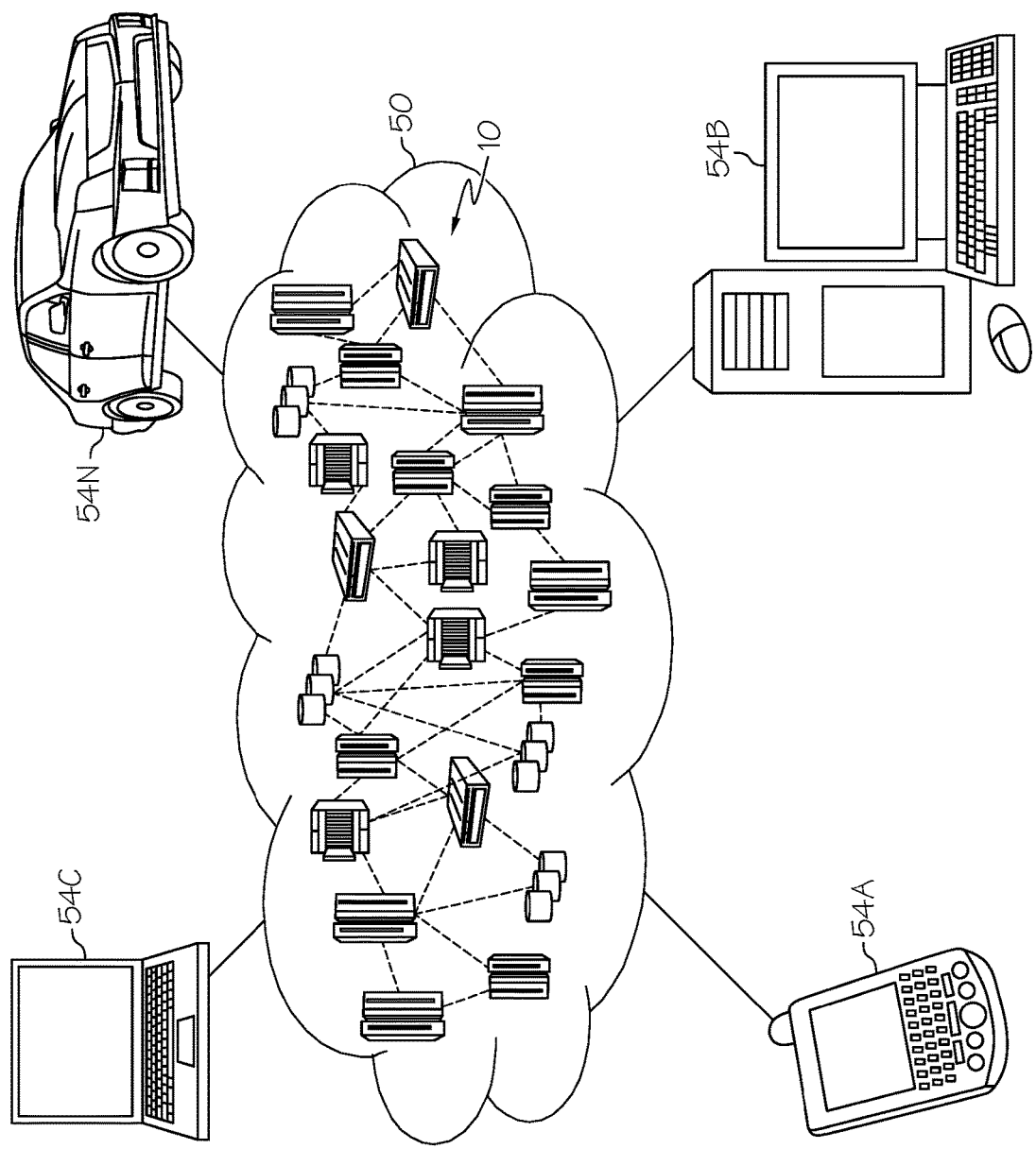
FIG. 10 depicts a cloud computing environment according to an embodiment of the present invention.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 10 are intended to be illustrative only and that computing nodes 10 and cloud computing environment 50 can communicate with any type of computerized device over any type of network and/or network addressable connection (e.g., using a web browser).

Figure 11:
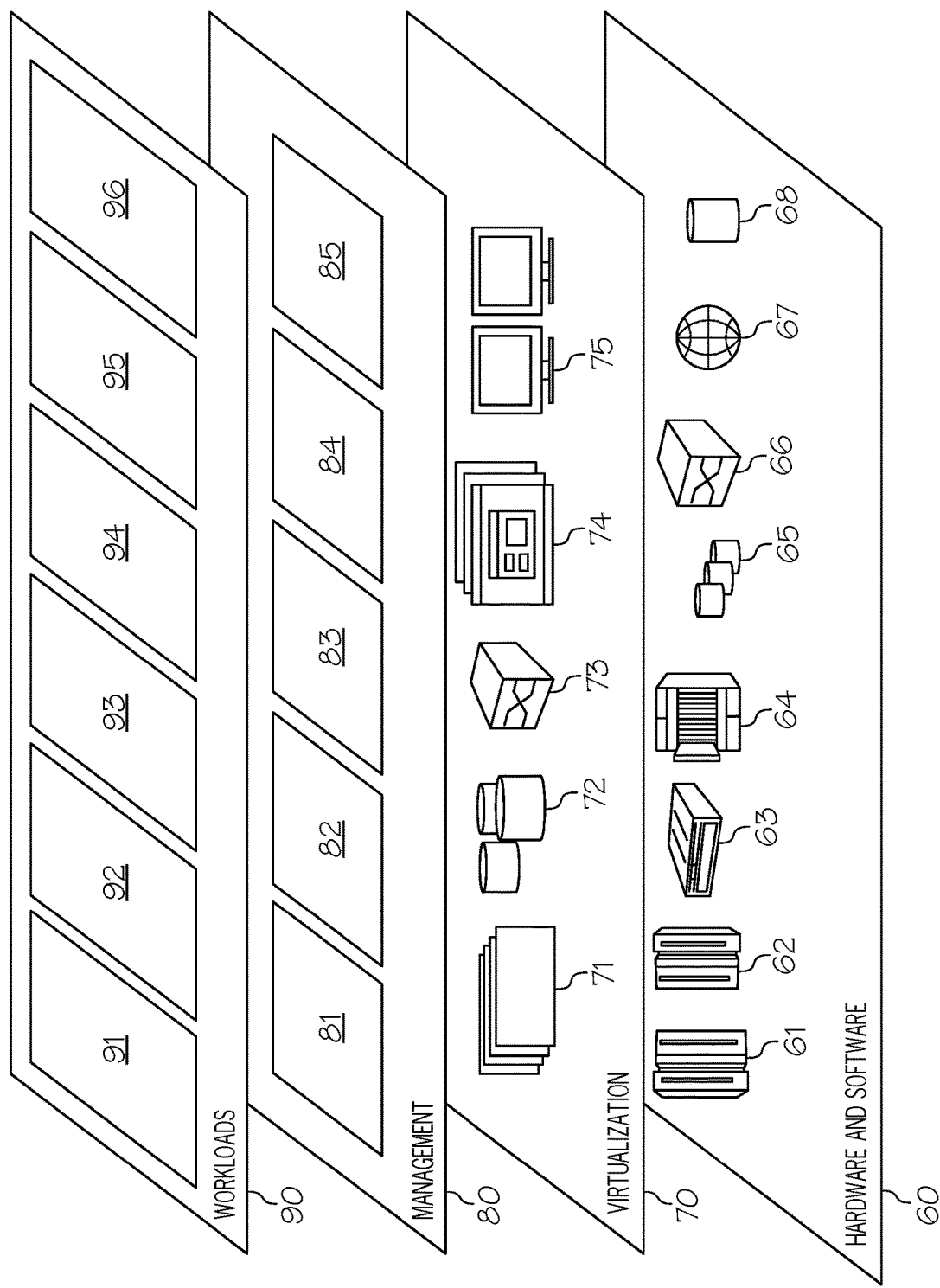
FIG. 11 depicts abstraction model layers of a cloud computing environment according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computational storage server management processing 96, which can perform one or more features of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Methods described in the present invention may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. By way of further example (only), one or more computer-implemented (e.g., in software) methods described herein may be emulated by a hardware-based VHDL program, which can then be applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
setting up, by a computational storage server, a computational storage media in the computational storage server, wherein the computational storage media is set up to comprise a first memory area for storing the input data received from multiple clients, a second memory area designated for storing computation functions that are executed by the computational storage server using the input data received from the multiple clients, a client specific management metadata area in the computational storage media for storing metadata related to computations performed in the computational storage server for specific clients, and a persistent storage area designated for storing checkpoints for aggregating computations performed by the computation functions;
detecting, by the computational storage server, an indication from one or more clients from the multiple clients indicating a probe-ready status for the computational storage media;
in response to one or more clients from the multiple clients indicating the probe-ready status for the computational storage media, exposing, by the computational storage server, the computational storage media to the multiple clients as an available storage media;
receiving, by the computational storage server, input data from the multiple clients;
executing, within the computational storage server, one or more computation functions using the received input data as inputs;
aggregating, by the computational storage server, outputs of the one or more computation functions that used the received input data as inputs; and
returning, from the computational storage server to the multiple clients, aggregated outputs of the one or more computation functions that used the received input data as inputs.

2. The computer-implemented method of claim 1, further comprising:
setting up, by the computational storage server, the persistent storage area in the computational storage media that is designated for storing and returning the checkpoints used during said aggregating the outputs of the one or more computation functions.

3. The computer-implemented method of claim 1, wherein the computational storage server communicates using POSIX-compliant I/O interfaces.

4. The computer-implemented method of claim 1, wherein the computational storage server is a management computational storage server, wherein the one or more computation functions are a matrix of multiple different computation functions that execute using different computer languages, and wherein the computer-implemented method further comprises:
splitting, by the management computational storage server, the matrix into multiple sub-matrixes of computation functions, wherein each of the multiple sub-matrixes is written in a different computer language than other sub-matrixes from the multiple sub-matrixes;
storing, by the management computational storage server, each of the multiple sub-matrixes into a different computational storage server, wherein each different computational storage server is specific for a particular computer language;
receiving, by the management computational storage server, first data from a first client that is written in a first computer language;
receiving, by the management computational storage server, second data from a second client that is written in a second computer language;
transmitting, by the management computational storage server, the first data to a first computational storage server than contains a first sub-matrix computational function that runs under the first computer language;
transmitting, by the management computational storage server, the second data to a second computational storage server than contains a second sub-matrix computational function that runs under the second computer language;
receiving, by the management computational storage server, a first result from the first computational storage server and a second result from the second computational storage server, wherein the first result is an output of the first sub-matrix computational function using the first data, and wherein the second result is an output of the second sub-matrix computational function using the second data;
consolidating, by the management computational storage server, the first result and the second result into a consolidated result; and
sending, from the management computational storage server, the consolidated result to the first client and the second client.

5. The computer-implemented method of claim 4, further comprising:
receiving, by the first computational storage server, a set of global parameters from a global parameter server, wherein the set of global parameters comprises data that weights one or more operands used in the first sub-matrix computational function; and
executing, by multiple learner processors in the first computational storage server, the first sub-matrix computational function using the set of global parameters.

6. The computer-implemented method of claim 1, further comprising:
striping, by the computational storage server, the one or more computation functions across a RAID storage system.

7. A computer program product for aggregating computation operations and their outputs from a computational storage server, wherein the computational storage server is a management computational storage server, the computer program product comprising a computer readable storage device having program instructions embodied therewith, the program instructions readable and executable by a computer to cause:
receiving input data from multiple clients;
executing one or more computation functions using the received input data as inputs, wherein the one or more computation functions are a matrix of multiple different computation functions that execute using different computer languages;
aggregating, by the computational storage server, outputs of the one or more computation functions that used the received input data as inputs;
returning, to the multiple clients, aggregated outputs of the one or more computation functions that used the received input data as inputs;

splitting, by the management computational storage server, the matrix into multiple sub-matrixes of computation functions, wherein each of the multiple sub-matrixes is written in a different computer language than other sub-matrixes from the multiple sub-matrixes;

storing, by the management computational storage server, each of the multiple sub-matrixes into a different computational storage server, wherein each different computational storage server is specific for a particular computer language;

receiving, by the management computational storage server, first data from a first client that is written in a first computer language;

receiving, by the management computational storage server, second data from a second client that is written in a second computer language;

transmitting, by the management computational storage server, the first data to a first computational storage server than contains a first sub-matrix computational function that runs under the first computer language;

transmitting, by the management computational storage server, the second data to a second computational storage server than contains a second sub-matrix computational function that runs under the second computer language;

receiving, by the management computational storage server, a first result from the first computational storage server and a second result from the second computational storage server, wherein the first result is an output of the first sub-matrix computational function using the first data, and wherein the second result is an output of the second sub-matrix computational function using the second data;

consolidating, by the management computational storage server, the first result and the second result into a consolidated result;

sending, from the management computational storage server, the consolidated result to the first client and the second client;

receiving, by the first computational storage server, a set of global parameters from a global parameter server, wherein the set of global parameters comprises data that weights one or more operands used in the first sub-matrix computational function; and executing, by multiple learner processors in the first computational storage server, the first sub-matrix computational function using the set of global parameters.

8. The computer program product of claim 7, wherein the program instructions are further readable and executable by the computer to cause:

setting up, by the computational storage server, a computational storage media in the computational storage server, wherein the computational storage media is set up to comprise a first memory area for storing the input data received from the multiple clients, a second memory area designated for storing computation functions that are executed by the computational storage server using the input data received from the multiple clients, a client specific management metadata area in the computational storage media for storing metadata related to computations performed in the computational storage server for specific clients, and a persistent storage area designated for storing checkpoints for aggregating computations performed by the computation functions;

detecting, by the computational storage server, an indication from one or more clients from the multiple clients indicating a probe-ready status for the computational storage media;

in response to one or more clients from the multiple clients indicating the probe-ready status for the computational storage media, exposing, by the computational storage server, the computational storage media to the multiple clients as an available storage media; and aggregating, by the computational storage server, outputs of one or more aggregated computation functions at the checkpoints based on the metadata.

9. The computer program product of claim 7, wherein the multiple clients transmit the updated data to the computational storage server using POSIX-compliant I/O interfaces.

10. The computer program product of claim 7, wherein the method further comprises:

striping, by the computational storage server, the one or more computation functions across a RAID storage system.

11. The computer program product of claim 7, wherein the program instructions are provided as a service in a cloud environment.

12. A computer system comprising:

one or more processors;

one or more computer readable memories, operably coupled to the one or more processors, wherein the one or more computer readable memories store program instructions for execution by at least one of the one or more processors, the stored program instructions comprising:

program instructions to set up a computational storage media in a computational storage server, wherein the computational storage media is set up to comprise a first memory area for storing input data received from multiple clients, a second memory area designated for storing computation functions executed by the computational storage server using the input data received from the multiple clients, a client specific management metadata area in the computational storage media for storing metadata related to computations performed in the computational storage server for specific clients, and a persistent storage area designated for storing checkpoints for aggregating computations performed by the computation functions;

program instructions to detect an indication from one or more clients from the multiple clients indicating a probe-ready status for the computational storage media;

program instructions to, in response to one or more clients from the multiple clients indicating the probe-ready status for the computational storage media, expose the computational storage media to the multiple clients as an available storage media;

program instructions to receive input data from the multiple clients;

program instructions to execute one or more of the computation functions using the received input data as inputs;

program instructions to aggregate outputs of the one or more computation functions that used the received input data as inputs; and program instructions to return, to the multiple clients, aggregated outputs of the one or more computation functions that used the received input data as inputs.

13. The computer system of claim 12, further comprising:
program instructions to return, to the computational storage server that is aggregating the outputs of the one or more computation functions, checkpoints used during said aggregating the outputs of the one or more computation functions.

14. The computer system of claim 12, wherein the multiple clients transmit the updated data to the computational storage server using POSIX-compliant I/O interfaces.

15. The computer system of claim 12, wherein the computer system is a management computational storage server, wherein the one or more computation functions are a matrix of multiple different computation functions that execute using different computer languages, and wherein the computer system further comprises:
program instructions to split, by the management computational storage server, the matrix into multiple sub-matrixes of computation functions, wherein each of the multiple sub-matrixes is written in a different computer language than other sub-matrixes from the multiple sub-matrixes;
program instructions to store, by the management computational storage server, each of the multiple sub-matrixes into a different computational storage server, wherein each different computational storage server is specific for a particular computer language;
program instructions to receive, by the management computational storage server, first data from a first client that is written in a first computer language;
program instructions to receive, by the management computational storage server, second data from a second client that is written in a second computer language;
program instructions to transmit, by the management computational storage server, the first data to a first computational storage server than contains a first sub-matrix computational function that runs under the first computer language;
program instructions to transmit, by the management computational storage server, the second data to a second computational storage server than contains a second sub-matrix computational function that runs under the second computer language;
program instructions to receive, by the management computational storage server, a first result from the first computational storage server and a second result from the second computational storage, wherein the first result is an output of the first sub-matrix computational function using the first data, and wherein the second result is an output of the second sub-matrix computational function using the second data;
program instructions to consolidate, by the management computational storage server, the first result and the second result into a consolidated result; and
program instructions to send, from the management computational storage server, the consolidated result to the first client and the second client.

16. The computer system of claim 15, further comprising:
program instructions to receive, by the first computational storage server, a set of global parameters from a global parameter server, wherein the set of global parameters comprises data that weights one or more operands used in the first sub-matrix computational function; and
program instructions to execute, by multiple learner processors in the first computational storage server, the first sub-matrix computational function using the set of global parameters.

17. The computer system of claim 12, further comprising:
program instructions to stripe the one or more computation functions across a RAID storage system.

18. The computer system of claim 12, wherein the stored program instructions are provided as a service in a cloud environment.

* * * * *